(12) United States Patent
Genung

(10) Patent No.: US 6,212,896 B1
(45) Date of Patent: Apr. 10, 2001

(54) HEAT TRANSFER COLUMN FOR GEOTHERMAL HEAT PUMPS

(76) Inventor: John Genung, 565 W. End Ave., New York, NY (US) 10024

( * ) Notice: Subject to any disclaimer, the term of this patent is extended or adjusted under 35 U.S.C. 154(b) by 0 days.

(21) Appl. No.: 09/435,850

(22) Filed: Nov. 8, 1999

Related U.S. Application Data

(60) Provisional application No. 60/107,081, filed on Nov. 5, 1998.

(51) Int. Cl.$^7$ ................................................ F25D 23/12
(52) U.S. Cl. ................................................ 62/260; 165/45
(58) Field of Search ................................ 62/260; 165/45

(56) References Cited

U.S. PATENT DOCUMENTS

| | | | |
|---|---|---|---|
| 4,566,532 | * | 1/1986 | Basmajian ............................... 165/45 |
| 4,574,875 | * | 3/1986 | Rawlings et al. ....................... 165/45 |
| 4,993,483 | * | 2/1991 | Harris ..................................... 165/45 |
| 5,203,173 | * | 4/1993 | Horton ................................. 165/45 X |
| 5,623,986 | * | 4/1997 | Wiggs .................................... 165/45 |

FOREIGN PATENT DOCUMENTS

687043 * 8/1996 (CH) .

* cited by examiner

Primary Examiner—William Doerrler
Assistant Examiner—Chen-Wen Jiang
(74) Attorney, Agent, or Firm—Charles E. Temko

(57) ABSTRACT

An improved heat transfer column for geothermal heating and cooling in which refrigerant lines are wound about a thin wall vertically oriented tube. The tube is surrounded by a flexible liner which is filled with water, the liner being positioned within a cavity in an earth mass. During operation, water within the tube rises by convection and transfers heat evenly to the water within the liner for subsequent transfer to the earth mass. This heat is subsequently extracted from the earth mass during a heating cycle, and means is provided for transfer of a portion of the heat in the water to the ambient atmosphere.

10 Claims, 2 Drawing Sheets

HEAT TRANSFER COLUMN FOR GEOTHERMAL HEAT PUMPS

RELATED APPLICATION

Reference is made to my copending Provisional Pat. Application Ser. No. 60/107,081, filed Nov. 5, 1998 from which priority is claimed.

BACKGROUND OF THE INVENTION

This invention relates generally to the field of geothermal heating and cooling, and more particularly to an improved heat transfer column positioned within an earth mass for transfer of heat to and from the earth mass.

At the present state of the art, known earth coupling devices have not proved capable of providing proper and predictable control of the refrigerant as it interfaces with the earth. The principal problem appears to be that of uneven distribution of thermal transfer, the result of formation of hot or cold spots which prevent uniform distribution of thermal transfer. Ultimately, there is a failure to utilize the full capacity of the surrounding earth mass which functions as a heat sink.

This problem is complicated by relatively large horizontal land mass requirements and accompanying extensive excavation during original installation and subsequent service operations.

Another problem lies in the inability of the land mass to store large amounts of heat during periods of excessive hot weather. Conventional prior art systems have no provision for transferring heat to the surrounding atmosphere to avoid degenerating the land mass by creating soil burnout.

SUMMARY OF THE INVENTION

Briefly stated, the invention contemplates the provision of an improved heat transfer column which is positioned in the surrounding earth mass in substantially vertical orientation. The column includes a centrally disposed pipe approximately three inches in diameter and twelve to fourteen feet long. Refrigerant lines from the heat pump compressor are wound about the pipe in spiral fashion. Surrounding the pipe in spaced relation is a polymeric liner filled with water containing an antifreeze mixture. The earth mass contacts the outer surface of the liner. The water circulates through and about the outer surface of the pipe by convection. The result is a superior degree of heat transfer with a total elimination of hot or cold spots.

As a further result, the horizontal land mass requirements have been significantly reduced when compared to prior art horizontally positioned copper tubing and water pipe fields. This permits the placement of the disposed system in relatively restricted areas and mixed terrain without extensive excavation, both during original installation and subsequent repair operations.

The present system, rather than transferring heat directly from a refrigerant to the earth mass, first transfers the heat to a substantial mass of water which is continuously circulating, and from the water to the earth mass over a substantial area.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
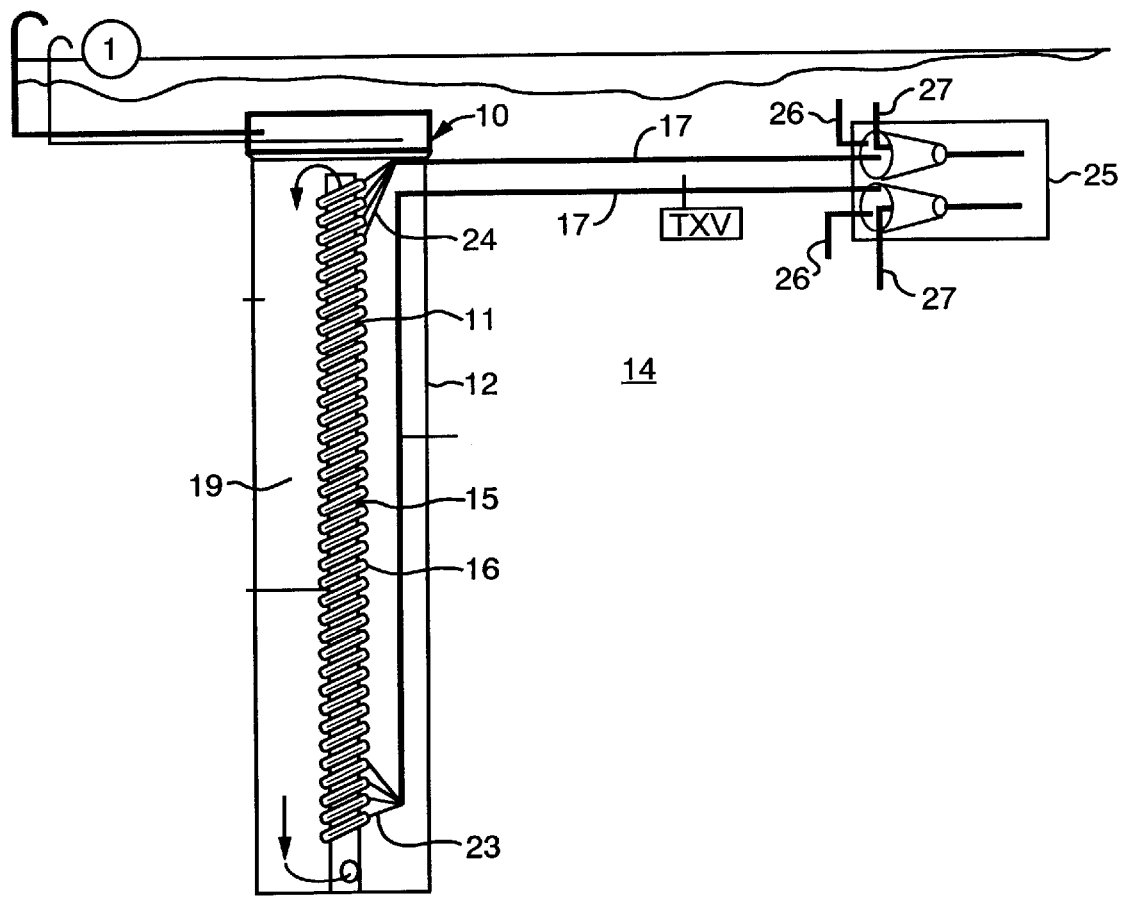
FIG. 1 is a schematic vertical sectional view of an embodiment of the invention.

In accordance with the invention, the device, generally indicated by reference character 10, comprises: a rigid centrally positioned hollow tube 11 and a surrounding flexible tube 12 positioned within a void in a surrounding earth mass 14. The outer surface 15 of the tube 11 supports a copper tube winding 16 communicating with refrigerant lines 17 communicating with a heat pump compressor (not shown). A mixture of water and antifreeze 19 fills the space between the sleeve 12 and pipe 11, as well as the interior of the pipe. One of the refrigerant lines 17 may include a TXV valve located on the refrigerant line set from the compressor, or at the top of the column depending upon the number of columns utilized in a particular application. This valve monitors the evaporation of the refrigerant during a heating cycle, and ensures that the proper amount of refrigerant is allowed to enter the column to achieve a minimum level of super heat prior to exiting the column. The valve is by-passed in the cooling mode of operation, as is known in the art.

The copper tubes 16 are arranged so that the refrigerant enters at a lower region 23 and exits from an upper region 24. In the cooling mode, the hot refrigerant gas enters the lower region of the column at a temperature ranging from 165 to 180 degrees F. The tubes, which are preferably of one-quarter inch diameter, are in full contact with the water solution. The water solution contained within the tube 11 at the lower region 23 is thus heated to a greater temperature than at the upper region 24. This additional heat energy causes the water within the tube to move upward to create a cyclic motion.

Continuing compressor operation causes an increase in the temperature of the lower region thereby increasing the rate of flow of the tube and, as a result, the mixing rate of the liquid mass is also increased.

Since heat transfer is a function of temperature difference, the greater the difference between the refrigerant temperature and the water, the greater the heat transfer therebetween. Similarly, as heat is transferred from the refrigerant to the water, the difference between the water and the earth mass increases as does the heat transfer.

In the heating mode, the refrigerant carries a temperature lower than that of the water, and chills the water at the lower end of the column to cause a convection in an opposite direction in which water within the tube 11 falls rather than rises. Because the sleeve 12 is flexible, it readily conforms to the surface of the cavity in which it is disposed to afford even heat transfer in either direction.

To enable the use of more than one heat transfer column, a refrigerant distribution box 25 is provided with plural low pressure and high pressure lines 26 and 27, respectively.

Figure 2:
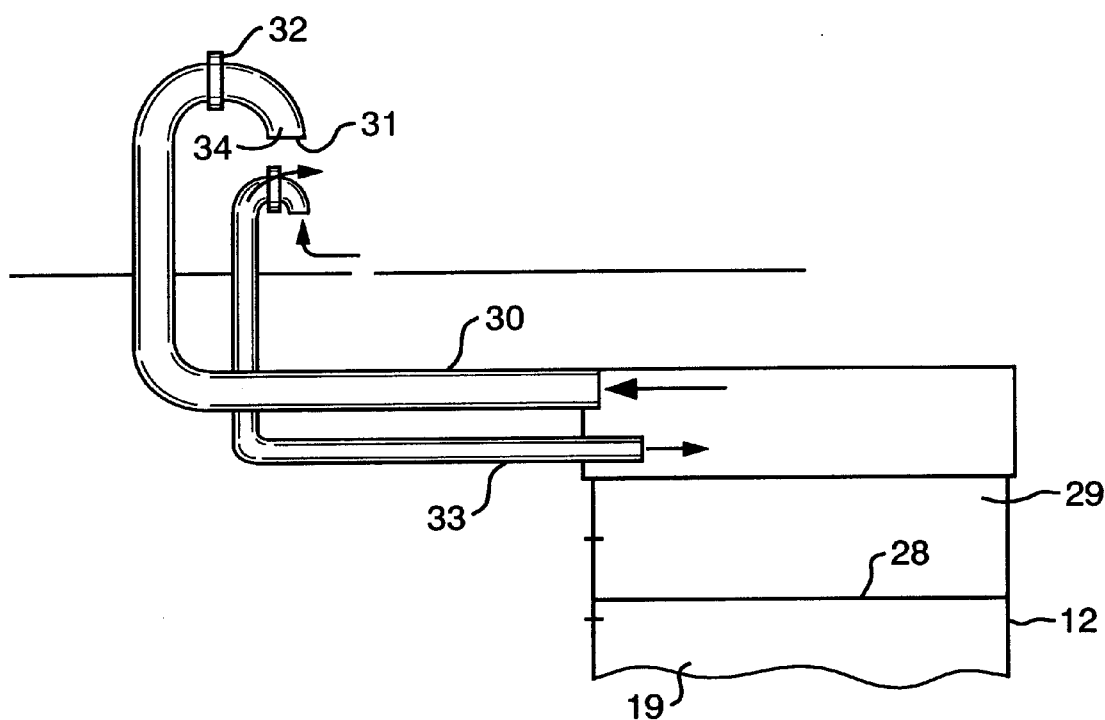
FIG. 2 is an enlarged fragmentary elevational view corresponding to the upper left-hand portion of FIG. 1.

Referring to FIG. 2, there is illustrated a means for dissipating excess heat to the surrounding atmosphere. The liner 12 extends above the upper surface 28 of the water 19 to form a chamber 29. An exit pipe 30 extends to a free end 31 above the ground, and is provided with a flap valve 32, or similar means. A corresponding outlet pipe 33 has a similar one-way valve 34. Thus, heat flowing from the surface of the water forms a convection path to vent excess heat from the liquid to the ambient atmosphere. The heat transfer function is self-regulating, since the rate of heat transfer is related to the heat of the circulating liquid.

The column has been tested utilizing two columns, each eighteen inches in diameter and fifteen feet in depth matched with a two-ton compressor unit and a two and one-half ton air handler. Columns and masses may be modified to perform, based upon conditions of soil heat transfer rates at the application site. The modification is directed toward the number of columns required as opposed to the design of the column. After a continuous run of seven days, an equilibrium temperature of 87 degrees F. was achieved in the cooling mode. The unit was allowed to cycle the remainder of the cooling season and then change to the heating mode and allowed to run for two months, and then placed in continuous run for twelve days which established a minimum operating temperature of 41 degrees F.

In the preferred embodiment, the sleeve 12 is formed as a membrane of reinforced polymers, and will generally be between 18 and 30 inches in diameter, and 15 to 10 feet in length. One end of the membrane is fusion welded to prevent leakage, while the other end is left open to accommodate the actual column, and the above described transfer of heat to the ambient air. The tube 11 is preferably a schedule 40 PVC pipe with a twelve inch base mount and a top retainer ring equal in diameter to the diameter of the bore plus six inches. The base mount and upper three feet of the column are provided with penetration points (not shown) to facilitate the free flow of liquid. The copper tubing 16 consists of approximately four one hundred foot copper tubes of quarter inch diameter wound tightly around the tube 11 to form a spiral covering.

It will be apparent that since the entire body of water 19 is in motion due to the convection phenomenon, it has the capacity to absorb more heat as compared to a stationary field which requires that the area receiving the heat transfer must always receive it at a common area. Eventually, the stationary field portion of the heat sink will lose its capacity to transfer any heat. In the disclosed device, the column reverses its process in the heating mode by injecting subcooled (15 to 25 degrees F.) refrigerant at the top of the column, thus cooling the liquid at the top of the column and causing it to fall through the column, to create a convective flow in a reverse direction.

It may thus be seen that I have invented novel and highly useful improvements in geothermal heating and cooling heretofore unavailable in the art. By providing means whereby eliminating direct heat transfer from the refrigerant to the ground, it is possible to obtain a number of substantial advantages.

Rather than dispose the transfer tubing in horizontal orientation in the earth mass, the present invention provides for vertical positioning of the tubes about a hollow pipe positioned in a large volume of water, such that the water circulates by convection to transfer heat to the land mass over a large vertically-extending area. Depending upon requirements, several vertical columns may be provided, each functioning in a similar manner. Land utilization is increased, and installation and servicing is less disruptive.

I wish it to be understood that I do not consider the invention to be limited to the precise details of structure shown and set forth in the specification, for obvious modifications will occur to those skilled in the art to which the invention pertains.

I claim:

1. A heat transfer column for geothermal heat pump systems comprising: a vertically positioned hollow tube having upper and lower ends; spirally wound refrigeration coils communicating with a heat pump compressor and contacting an outer surface of said tube; a second tube of diameter substantially greater than that of said first tube and positioned to surround said first tube to form an elongated void therebetween, and a liquid vehicle filling said void; said tubes being positioned within an earth mass whereby during operation, said refrigerant coils transfer heat to and from said liquid vehicle disposed within said first tube to cause a convection cycle within said liquid to bring said liquid to a uniform temperature throughout.

2. A heat transfer column in accordance with claim 1, in which said first tube is formed by a rigid synthetic resin tube having a diameter approximating three inches, and a length between ten to fourteen feet.

3. A heat transfer column in accordance with claim 1, in which said second tube is formed from a flexible polymeric material and having a diameter of approximately twenty-four inches.

4. A heat transfer column in accordance with claim 1, in which the refrigerant coils introduce refrigerant at a lower end of said first tube.

5. A heat transfer column in accordance with claim 1, in which the liquid vehicle is water containing an antifreeze component.

6. A heat transfer column in accordance with claim 1, further comprising a uni-directional valve positioned on line with the refrigerant coils for monitoring evaporation of refrigerant during a heating cycle to obtain a minimum level of super heat prior to exiting the column.

7. A heat transfer column in accordance with claim 1, further comprising a chamber disposed above an upper surface of said liquid vehicle for venting heat from said liquid vehicle to an ambient atmosphere above said earth mass.

8. A heat transfer column in accordance with claim 7, said chamber having inlet and outlet venting tubes for circulating air therethrough by thermal convection.

9. In a geothermal heat pump system for transferring heat to and from a refrigerant to a land mass, the improvement comprising a vertical cavity in said land mass; lining means within said cavity in contact with said land mass, a fluid contained by said lining means, and refrigerant heat transfer means positioned within said fluid, said heat transfer means causing said fluid to circulate within said lining means by convection currents.

10. A geothermal heat pump system in accordance with claim 9, further comprising means for transferring heat from said liquid to an ambient atmosphere above said cavity.

* * * * *